United States Patent Office 3,306,057
Patented Feb. 28, 1967

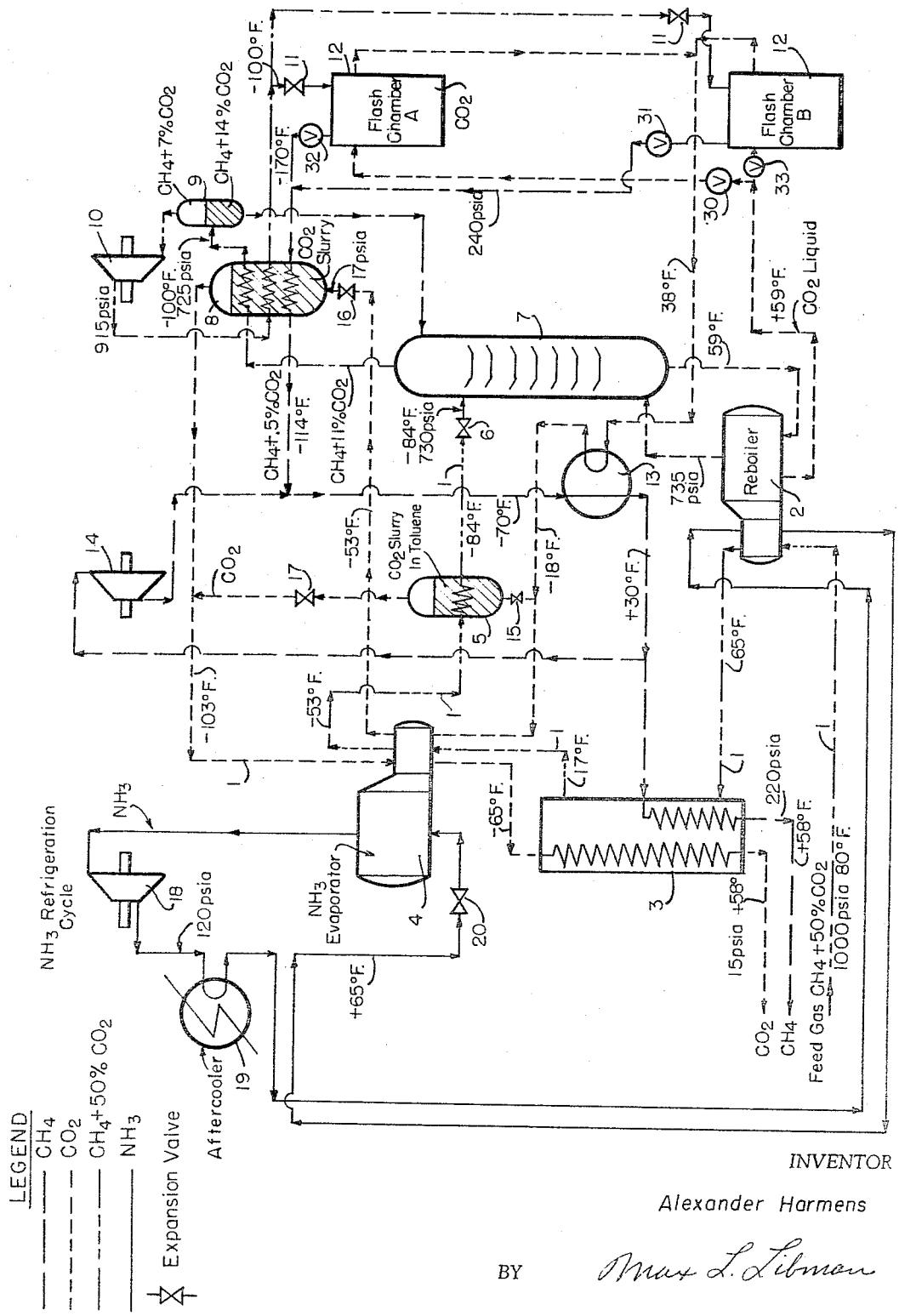

3,306,057
PROCESS FOR THE COLD SEPARATION OF GASEOUS MIXTURES WITH SOLID-LIQUID SLURRY HEAT EXCHANGE
Alexander Harmens, Purley, Surrey, England, assignor to Conch International Methane Limited, Nassau, Bahamas, a Bahamian company
Filed Aug. 26, 1964, Ser. No. 392,123
Claims priority, application Great Britain, Nov. 4, 1963, 43,416/63
10 Claims. (Cl. 62—12)

This invention is concerned with the separation or purification of a gas mixture which can be totally liquefied and contains a substantial amount of a component having a relatively high freezing point. A typical mixture to which the present invention may apply is a natural gas stream which, apart from other impurities such as hydrogen sulphide, is rich in carbon dioxide. While proposals have been made for the purification of a natural gas stream containing carbon dioxide by means of refrigeration cycles, these have been directed more specifically to the removal of carbon dioxide impurities in amounts which constitute a minor proportion of the feed. When the problem is to purify a natural gas rich in carbon dioxide, as for instance a stream containing about 50% or more of carbon dioxide, difficulties are encountered in applying the proposals hitherto available, and indeed, such proposals are either not basically suitable or impracticable for such a separation problem.

The problem of liquefaction of the feed gas by indirect heat exchange with the product streams is complicated rather than assisted by the large relative volatility of the two components in a methane-carbon dioxide mixture. At elevated pressures carbon dioxide is liquefied out at relatively high temperatures and is thus not immediately suitable for heat exchange purposes. There also arises a danger of freezing carbon dioxide in heat exchangers, and this risk imposes severe limits on the value of carbon dioxide as a refrigerant.

According to the present invention, a method of purifying by refrigeration a gas stream containing a substantial amount of a relatively high freezing point component A, comprises the steps of:

(a) Cooling the compressed gas stream in a system which includes a first heat absorber charged with cold product A and condensing said stream to a liquid;

(b) Fractionating said liquid to yield liquid component A and a gas contaminated with A;

(c) Partially condensing the contaminated gas in a second heat absorber charged with cold product A, recompressing, chilling and expanding the gaseous fraction to freeze out contaminating component A as a solid; and (d) Combining this solid component A with liquid bottoms from the fractionator reboiler and using the combined medium as coolant in the aforesaid heat absorbers.

In a more specific embodiment of the present invention, a natural gas mixture containing as the sole or main contaminant a substantial amount of carbon dioxide, is purified by a process which comprises the steps of:

(a) Cooling the compressed stream in a system which includes a first heat exchanger charged with cold carbon dioxide and condensing it to a liquid;

(b) Fractionating said liquid to yield substantially pure liquid carbon dioxide and a methane-rich gas;

(c) Partially condensing this methane-rich gas in a further second heat absorber charged with cold carbon dioxide, recompressing, chilling and expanding the gaseous fraction to separate out contaminating carbon dioxide as a solid; and (d) Combining this solid carbon dioxide with the liquid bottoms from the fractionator reboiler and using the combined medium as coolant in the aforesaid heat absorbers.

Advantageously, the feed gas stream refrigeration is assisted by a separate ammonia cycle, wherein the reboiler for the fractionator also serves to condense compressed ammonia, as will be hereinafter more fully explained. Moreover, the gasous carbon dioxide evaporated off from the said heat absorbers can also serve to assist in the chilling of the feed gas.

In the aforesaid heat absorbers I prefer to employ a carrier liquid and to feed the cold carbon dioxide represented by the joint stream formed from mixing the liquid bottoms from the refractionator reboiler with solid carbon dioxide in a flash chamber, into said heat absorbers through pressure reducing valves. Thereby solid carbon dioxide is deposited as a slurry in the carrier liquid, and by heat exchange with incoming feed is caused to sublime yielding gaseous carbon dioxide. Advantageously, the joint stream prior to any pressure release is caused to yield heat to the cold purified methane.

As suitable carrier liquids, a wide variety of organic liquids having a low boiling point are suitable, and of these toluene might be singled out as particularly suitable. A light gasoline or gasoline fraction may also be mentioned as a useful carrier liquid. The fractionator reboiler provides heat to the fractionator by absorbing heat from compressed ammonia and from incoming feed. Thereby liquid bottoms from the fractionator are partially vaporized and recycled and the cold liquid carbon dioxide leaving the reboiler is substantially pure.

The second heat absorber advantageously serves as partial reflux condenser for the fractionator and thus ensures a purer stream of methane passing to the compressor. The compressed gas from the latter can again be chilled in this heat absorber before flashing to a simple flash chamber where contaminating carbon dioxide is frozen out. The purified gas, considerably colder through this flashing operation, may be returned through the second heat absorber and there supplements the refrigeration effected by the slurry of solid carbon dioxide in carrier liquid. The heat gained by the purified methane still leaves the latter containing much surplus cold and a considerable dilution with warmer purified methane is desirable to yield a stream suitable for heat exchange with the refrigerating stream of substantially pure liquid carbon dioxide; otherwise the latter may in part freeze before reaching the heat absorbers.

The invention can now be more described by reference to the accompanying drawing, which shows schematically a flow-sheet arrangement adapted for the purification according to the present invention of a feed gas containing about equal volumes of methane and carbon dioxide.

The dry feed gas at 1000 p.s.i.a. and 80° F., enters via line 1 a distillation reboiler 2 which as hereafter described contains a coil through which ammonia cycles continuously. In this reboiler the feed gas is chilled to 65° F. and then passes to vessel 3 where heat exchange with the returning product gases lowers the temperature to 17° F. The gas in line 1 then enters evaporator 4 where it is further cooled and partially condensed by evaporating liquid ammonia and emerges at a temperature of −53° F. From this evaporator it passes, still in line 1, to heat absorber 5 where it is refrigerated by a slurry of solid carbon dioxide in a carrier liquid such as toluene, where further condensation occurs and the temperature falls to −84° F. The feed gas then passes on line 1 through a pressure reduction valve 6 and enters a distillation column 7 at a pressure of 730 p.s.i.a. and at about −84° F.

This column contains seven theoretical trays, the feed being supplied to the top tray. Fractionation occurs with liquid bottoms consisting of nearly pure carbon dioxide leaving the column at about 59° F. The gas leaving the top of the column contains some 11.5 percent carbon dioxide and is partially condensed in heat absorber 8 containing a slurry of solid carbon dioxide in a carrier liquid. The two phases pass to separator 9 at about −100° F. and 725 p.s.i.a. The liquid phase containing some 14 percent carbon dioxide is returned as reflux to the fractionator 7, while the gaseous phase now containing only some 7 percent carbon dioxide is compressed by a compressor 10 to 915 p.s.i.a. It is again chilled in exchanger 8 to −100° F. and thereupon passes via pressure reducing valve 11 to one of two flash chambers 12—marked A and B. Flashing to about 240 p.s.i.a. leads to a fall in temperature to −170° F. and the freezing out of substantially all contaminating carbon dioxide.

The purified methane which emerges from the flash chamber contains only 0.5 percent carbon dioxide and is heated to −114° F. by returning through a separate coil in heat absorber 8. It is thereafter diluted with warmer purified methane as hereinafter described.

The liquid bottoms from fractionator 7 passes to reboiler 2 where it is partly evaporated at 735 p.s.i.a. by heat recovered from incoming feed and compressed ammonia. In this way slightly contaminated gaseous carbon dioxide is returned to fractionating column 7 while substantially pure liquid carbon dioxide leaves the reboiler at 59° F. passing to a flash chamber 12, shown in the drawing as B.

The flash chambers A and B are adapted and arranged to be switched over, by means of valves 30, 31, 32 and 33 and expansion valves 11, so that they alternate in their functions as and when one becomes largely full of solid carbon dioxide. This operation may of course be made automatic by means of level controls (not shown) if desired. When as shown in the drawing, chamber A becomes largely full of solid carbon dioxide, it is switched with flash chamber B. The latter, as shown in the drawing, serves as a vessel wherein the solid carbon dioxide frozen out from the purified methane is taken up and dissolved in the warmer stream of pure liquid carbon dioxide from reboiler 2.

The combined stream of liquid carbon dioxide leaving the flash chamber is designed to serve as coolant in heat absorbers 5 and 8, but to this end it needs to be further cooled, and such cooling is first effected by heat interchange in vessel 13. The chilling medium is the purified methane derived by the means already set forth, but so adjusted in temperature as to avoid any freezing out of solid carbon dioxide from the refrigerant stream. Such adjustment is effected by feeding back through circulator 14 warmer purified gas downstream of vessel 13. The feed-back rate is adjusted so as to produce a purified gas of −70° F. which is heat exchanged in vessel 13 with the refrigerant from chamber 12 at a temperature of about 38° F. Thereby the purified gas is raised to a temperature of about 30° F. and by absorbing further heat in vessel 3 from incoming feed it finally emerges at a temperature of 58° F. and pressure of about 220 p.s.i.a.

The liquid refrigerant medium emerging from vessel 13 is chilled to about −18° F. and part is thereafter flashed via pressure reducing valve 15 to heat absorber 5. At a pressure of 32.5 p.s.i.a. carbon dioxide freezes out as a slurry in the carrier liquid and serves to extract heat from partly condensed feed gas, being thereby sublimed to a gas. The remainder of the liquid refrigerant is further cooled in evaporator 4 to −53° F. by the evaporation of liquid ammonia, and then passes via pressure reducing valve 16 to heat absorber 8, which it enters at a pressure of 17 p.s.i.a. to serve as refrigerant and partial condenser for the gas passing off from fractionator 7. Here also solid carbon dioxide is deposited as a slurry in the carrier liquid, and in serving as refrigerant sublimes off to yield pure gaseous carbon dioxide.

The gaseous carbon dioxide sublimed off from heat absorber 5 is equalized in pressure by reduction valve 17 with the gas sublimed off from absorber 8, which it joins to give a combined stream at a temperature of −103° F. This combined stream passes to evaporator 4 where contributing to the cooling action, it is itself warmed up to −65° F. Further heat is gained from incoming feed in vessel 3 from which the carbon dioxide emerges at a temperature of 58° F. and a pressure of 15 p.s.i.a.

The separate ammonia refrigeration cycle which provides external cooling includes a two-stage compressor 18 with intercooler (not shown) in which the ammonia is compressed to 120 p.s.i.a. and aftercooler 19 and the reboiler 2 (shown in two places in the drawing for ease of presentation). Here the ammonia is completely condensed at 65° F. in the course of partially vaporizing liquid bottoms from the fractionator, and emerges to pass to evaporator 4 through reduction valve 20.

The arrangement set forth by reference to the drawing when applied to the separation of $60 \times 10^6$ standard cubic feet per day of feed gas involved a power requirement of 6000 hp. and an ammonia circulation of 25.7 long tons per hour. Cooling water removed sensible heat from the gaseous compressed ammonia at a rate of about $12.15 \times 10^6$ B.t.u. per hour. The major portion of the total power requirement is accounted for in the pressure reductions of the feed gas.

It will be apparent that the embodiments shown are only exemplary and that various modifications can be made in construction and arrangement within the scope of my invention as defined in the appended claims.

What I claim is:

1. A method of purifying by refrigeration a gas mixture containing a substantial amount of a relatively high freezing point component comprising the steps of:
   (a) cooling the compressed gas stream in a system which includes a first heat absorber charged with cold product high freezing point component and condensing said stream to a liquid;
   (b) fractionating said liquid in a fractionator reboiler to yield liquid high freezing point component and a gas contaminated with high freezing point component;
   (c) partially condensing the contaminated gas in a second heat absorber charged with cold product high freezing point component recompressing, chilling and expanding the gaseous fraction to freeze out contaminating high freezing point component as a solid; and
   (d) combining this solid high freezing point component with liquid bottom component from the fractionator reboiler and using the combined medium as coolant in the aforesaid heat absorbers.

2. A method as claimed in claim 1 in which the refrigeration of the feed gas stream is assisted by a liquid ammonia cycle.

3. A process as claimed in claim 2, wherein additional cooling of the compressed gas stream is effected in an evaporator fed with liquid ammonia.

4. A process as claimed in claim 3, wherein cold gaseous carbon dioxide evaporated off from the said heat absorbers is caused to refrigerate fresh incoming feed.

5. A process as claimed in claim 4, wherein cold purified methane is caused to absorb heat in the second heat absorber.

6. A process as claimed in claim 5, wherein the cold purified methane serves to cool through heat interchange the combined liquid stream of carbon dioxide passing to the heat absorbers.

7. A process as claimed in claim 6, wherein the purified methane is adapted to cool the combined fluid stream of carbon dioxide without precipitating out solid carbon dioxide therefrom.

8. A process as claimed in claim 7, wherein the fluid stream of carbon dioxide is introduced into a carrier liquid in said heat absorbers through pressure reducing valves.

9. A process as claimed in claim 8, wherein the second heat absorber also provides a partial condenser and reflux for the fractionator.

10. A method of purifying a natural gas stream rich in carbon dioxide comprising the steps of:
(a) cooling the compressed gas stream in a system which includes a first heat absorber charged with cold carbon dioxide, and condensing said stream to a liquid;
(b) fractionating said liquid in a fractionator reboiler to yield substantially pure liquid carbon dioxide as bottom component and a methane-rich gas;
(c) partially condensing this methane-rich gas in a second heat absorber charged with cold carbon dioxide, recompressing, chilling and expanding the gaseous fraction to separate out contaminating carbon dioxide as a solid; and
(d) combining this solid carbon dioxide with the liquid bottom component from the fractionator reboiler and using the combined medium as coolant in the aforesaid heat absorber.

References Cited by the Examiner
UNITED STATES PATENTS

| | | | |
|---|---|---|---|
| 2,826,266 | 3/1958 | Hachmuth et al. | 62—12 XR |
| 3,130,026 | 4/1964 | Becker | 62—24 XR |
| 3,224,208 | 12/1965 | Schlumberger et al. | 62—12 |

NORMAN YUDKOFF, *Primary Examiner.*

V. W. PRETKA, *Assistant Examiner.*